US007445854B2

(12) United States Patent
Khan et al.

(10) Patent No.: US 7,445,854 B2
(45) Date of Patent: Nov. 4, 2008

(54) SEAL SYSTEM

(75) Inventors: Abdus Suttar Khan, Ennetbaden (CH); Ian William Boston, Ennetbaden (CH); James Alexander Hearley, Brugg-Lauffohr (CH)

(73) Assignee: ALSTOM Technology Ltd, Baden (CH)

( * ) Notice: Subject to any disclaimer, the term of this patent is extended or adjusted under 35 U.S.C. 154(b) by 512 days.

(21) Appl. No.: 10/799,755

(22) Filed: Mar. 15, 2004

(65) Prior Publication Data

US 2004/0185294 A1 Sep. 23, 2004

(30) Foreign Application Priority Data

Mar. 21, 2003 (EP) ................................ 03100733

(51) Int. Cl.
*B32B 15/00* (2006.01)
*B32B 15/04* (2006.01)
*B32B 15/16* (2006.01)
*F16J 15/00* (2006.01)

(52) U.S. Cl. ...................... 428/678; 428/215; 428/334; 428/457; 428/627; 277/535; 277/654

(58) Field of Classification Search ................. 428/627, 428/678, 668, 679, 666, 215, 216, 334, 457; 277/345, 534, 535, 541, 650, 653, 654
See application file for complete search history.

(56) References Cited

U.S. PATENT DOCUMENTS

| | | | | | |
|---|---|---|---|---|---|
| 3,743,556 | A * | 7/1973 | Breton et al. | 156/62.8 |
| 4,666,733 | A * | 5/1987 | Wlodek | 427/451 |
| 4,789,441 | A | 12/1988 | Foster et al. | |
| 4,822,248 | A * | 4/1989 | Wertz et al. | 416/192 |
| 4,884,820 | A * | 12/1989 | Jackson et al. | 277/415 |
| 5,223,332 | A * | 6/1993 | Quets | 428/216 |
| 5,419,976 | A | 5/1995 | Dulin | |
| 5,453,329 | A * | 9/1995 | Everett et al. | 428/565 |
| 5,558,758 | A | 9/1996 | Foster | |
| 5,935,407 | A | 8/1999 | Nenov et al. | |
| 6,194,086 | B1 | 2/2001 | Nenov et al. | |
| 6,302,318 | B1 | 10/2001 | Hasz et al. | |
| 6,398,103 | B2 | 6/2002 | Hasz et al. | |
| 6,423,432 | B1 | 7/2002 | Torigoe et al. | |
| 6,503,340 | B1 | 1/2003 | Gold et al. | |
| 2001/0006187 | A1 | 7/2001 | Hasz et al. | |
| 2001/0026845 | A1 | 10/2001 | Knight et al. | |

FOREIGN PATENT DOCUMENTS

| | | | |
|---|---|---|---|
| EP | 0484115 | A1 | 5/1992 |
| GB | 1358538 | | 7/1974 |

* cited by examiner

*Primary Examiner*—Michael E. Lavilla
(74) *Attorney, Agent, or Firm*—Buchanan Ingersoll & Rooney PC

(57) ABSTRACT

It is disclosed a method of deposting a seal coating and a seal system comprising at least two layers on the surface of an article. The upper or surface layer has a higher chromium activity than a bottom layer to reduce a diffusion of cobalt and the formation of cobalt oxide is reduced. The coating of invention may be heat-treated to reduce or optimize the formation of cobalt oxide to sustin the wear property.

19 Claims, 1 Drawing Sheet

SEAL SYSTEM

FIELD OF INVENTION

This invention relates to wear resistant seal coatings and a seal systemsincluding suck coatings.

STATE OF THE ART

The effectiveness of a seal between two mating surfaces of parts of an engine depends on the formation of a glazed layer on the surface during operating condition. For a seal to efficiently operate there must be a formation of adequate and correct amount of cobalt oxide glaze in the surface. For example, the formation of too little or too much of the glazed layer in cobalt and chromium carbide wear coating will adversely affect the life of the seal. An adequate but proper amount of cobalt oxide in the system is a necessary condition for the design life of the wear coating. Current seal systems of cobalt-chromium carbide have the limitation in that they form too much cobalt oxides at elevated temperatures and will not provide the desired life goal of a gas turbine seal system at high temperatures.

The wear coatings are generally applied by plasma spray process. For example, it is known from U.S. Pat. No. 5,419,976 to deposit chromium and tungsten carbide wear coatings by a HVOF process. Similarly, in US-A-2001/0026845, deposited wear, oxidation and corrosion resistant coatings by a HVOF process. The coatings disclosed were titanium silicon carbide i.e. H phase ceramics, of the generic type 3-1-2 and 2-1-1. While U.S. Pat. Nos. 6,302,318, 6,398,103 and US-A-2001/0006187 are disclosing methods of depositing wear resistant coatings, wherein a foil containing the wear coatings is first attached to the substrate surface and then fused by brazing. The wear coatings referred here are of chromium carbide type. U.S. Pat. No. 6,423,432 discloses a method of manufacturing wear coatings by first thermal spraying a powder mixture of Ni—Co alloy and chromium carbide to form a chromium carbide coating layer and then applying Al by diffusion and infiltration onto the carbide layer.

U.S. Pat. No. 6,503,340 discloses a method of forming chromium carbide coatings by carborizing the surface followed by chromizing to form chromium carbide coating.

U.S. Pat. No. 5,558,758 discloses a method of depositing a chromium carbide coating using an electroplated process. Briefly, the process involves deposition of chromium carbide particles held in suspension in the electrolytic bath containing cobalt salt in solution. The other examples of entrapment plating to produce the abrasive tips for gas turbine blades are disclosed in the U.S. Pat. No. 5,935,407 and U.S. Pat. No. 6,194,086. In the examples here the cubic boron nitride was plated from a suspension of boron nitride in the electrolytic bath onto plasma sprayed MCrAIX bond coats.

In the invention disclosed here the preferred method is the electroplated method as disclosed in U.S. Pat. No. 5,558,758. The electroplated method is preferred since the process has no line of sight limitation and the coating thickness could be better controlled than plasma spray process. Additionally the carbide wear coating is done at or near room temperature and the oxygen or nitrogen contamination (as would happen during plasma spray process) detrimental to ductility are eliminated.

SUMMARY OF THE INVENTION

The aim of the present invention is to develop a stable sealing system with an adequate but not excessive amount of cobalt oxide as the upper scale. This has been accomplished with a chromium rich inner scale to sufficiently slow down the supply of cobalt to the surface for re-oxidation and therefore preventing the rapid loss of the wear properties of the coatings in service. The second aim is to find a method to apply the wear resistant coating of invention onto the component with proper control of coating composition to provide adequate and correct amount of cobalt oxide glaze in the surface layer. Another aim is to be able to deposit a thin coating with no line of sight limitation or any oxide contamination as prevalent during plasma spray process.

According to the invention disclosed herein is a method of depositing a wear resistant seal coating.

In the duplex layer approach, the upper layer of the coating contains a higher volume fraction of chromium carbide than the layer below. In general, the seal system can be built up of multiple layers, each layer has an increasing amount of carbide content, with highest carbide content being in the top layer. The higher activity of chromium translates to formation of a chromium rich under layer which slows down the mobility of cobalt hence reduce the growth of the cobalt oxide on the surface. Therefore, in this case, the necessity of pre-heat-treatment of coating to form chromium containing scale is not essential.

According to the present invention the seal coating can be applied by using an electroplated method as mentioned in U.S. Pat. No. 5,558,758. It is noted that the cost of the application of a coating by a galvanic i.e. the plating process is with advantage a third of a conventional plasma spray coating. In addition, the process of the invention has a thickness control of ±20 μm of the thickness of the deposited layer, where as conventional plasma spray coating processes have thickness scatters of ±75 μm or even more. Thus, a coating with a layer thickness in a range of 25-400 μm can be applied. The used electroplated process has no line of sight limitation and can coat complex contour surfaces (i.e. a blade or vane) with uniformity.

In the duplex coating system the volume fraction of carbide in the bottom layer of the coating is between 20-30%. In the upper layer of the coating the volume fraction of carbide is in the range of 30% to 50%. The thickness of the upper layer is 25 to 75% of the total thickness of the coating and thickness of layers can be adjusted depending on the seal system stability and performance requirement.

Post coating heat-treatment can be applied to selectively enrich the upper coating with chromium. The coating is pre-heated at higher temperatures to enrich the upper layer with chromium. This heat treatment in vacuum is done at temperatures in the range from 800 to 1060° C. for time in the range half an hour to 100 hours. At 800° C. the chromium enrichment due to heat-treatment is low while at around 1060° C. chromium enrichment is significant i.e. a greater amount of chromia scale is formed. The heat-treat time interval is dependent on the heat-treat temperature itself, a considerably shorter time is needed at elevated temperature i.e. 30 minute at 1060° C. while at least a 100 hour heat-treatment is required at 800° C.

The coating according to the present invention can be provided as a seal system between mating surfaces of gas turbine components such as combustion liners etc.

BRIEF DESCRIPTION OF DRAWINGS

Preferred embodiments of the invention are illustrated in the accompanying drawings, in which.

Figure 1:
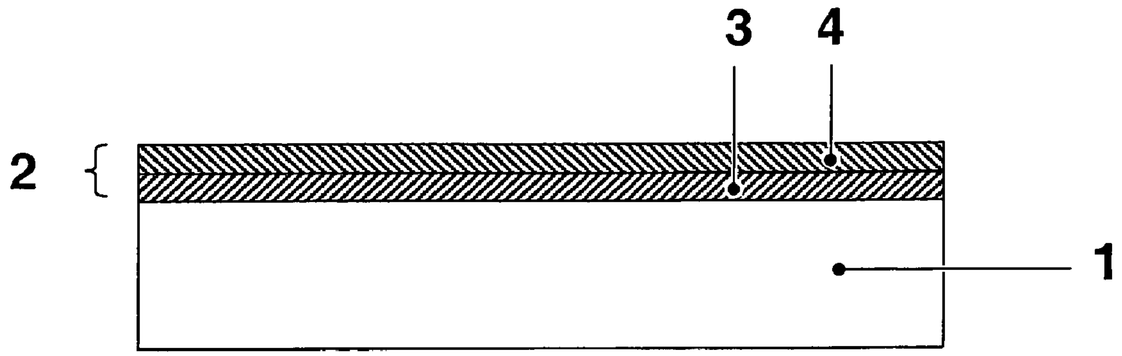
FIG. 1 shows as an example a wear protective duplex coating structure and FIG. 2 shows an application of an inventive seal system at a combustor liner of gas turbine.

The drawing shows only parts important for the invention.

DETAILED DESCRIPTION OF INVENTION

According to the present invention a wear resistant coating 2 which consists of at least two layers 3, 4 on the surface of an article 1. The upper or surface layer 4 has a higher chromium activity than a bottom layer 3.

In the present invention consists of the promotion for forming a chromium rich layer quickly beneath the glazed layer consisting of cobalt oxide. Once the chromium rich layer is formed; subsequent formation of cobalt oxide is reduced because now cobalt must diffuse through the chromium rich layer to the surface to promote cobalt oxide growth. In the present coating 2; the upper layer 4 has a higher amount of chromium carbides than the bottom layer 3. As it is typical, the chromium carbide is dispersed in the cobalt matrix. In general, the seal system can be built up of multiple layers, each layer has an increasing amount of carbide content, with highest carbide content being in the top layer.

The advantages of the layer system are that it will have a higher stability and better wear retention ability and may not require pre-heat treatment of the components. Oxidation studies conducted showed that the cobalt oxide is the upper scale but beneath scale contains a layer of chromium rich oxides. The presence of the chromium oxide in the scale is strongly dependent on time and temperature. A heat-treated coating formed a thinner scale during oxidation. The heat treatment of parts i.e. combustor components, in general could be done at temperatures up to 900° C. but at higher temperatures there could result in a deformation of the parts, i.e. combustor components. Nevertheless, substrates able to withstand higher temperature may accrue lifetime benefit by such heat-treatment.

Example of Pre-heat Treated Coating

A cobalt-chromium carbide coating containing 33% chromium carbide was deposited on substrates. The coatings were oxidized at 650° C. for 300, 1000 and 2632 hours respectively. The oxide grew relatively faster until 1000 hours and then slowed down dramatically such that the scale thickness at 1000 and 2632 hours was similar i.e. a minute increase in thickness from 1000 to 2632 hours. Longer time of exposure allowed the enrichment of the chromium below the cobalt oxide scale. The trend in scale thickness was similar at 800° C. Based on this observation samples were pre-heated at 800 and 1060° C. in a vacuum and then oxidized for at 800° C. in air. Pre-oxidation reduced the oxide thickness and reduction was more dramatic after heat-treatment at 1060° C. for 30 minute. The overall thickness of the coating 2 is up to 400 μm, the preferable range is from 50 to 250 μm.

In the duplex coating system the volume fraction of carbide i.e. between 20-30% in the bottom layer 3 of the coating 2. In the upper layer 4 of the coating 2 the volume fraction of carbide is in the range of 30 to 50%. The thickness of the upper layer 4 is 25 to 75% of the total thickness of the coating 2 and can be adjusted depending on the seal system stability and based on system performance.

Post coating heat-treatment can be applied to selectively enrich the upper coating layer 4 with chromium. This heat treatment in vacuum is done at temperatures in the range from 800 to 1060° C. for time in the range half an hour to 100 hours. At 800° C. the chromium enrichment due to heat-treatment is low while at around 1060° C. chromium enrichment is significant i.e. a greater amount of chromia scale is formed. Since cobalt oxide is absolutely necessary to sustain the wear properties, a heat-treatment temperature in the range 800 to 1000° C. is preferred or alternately a very short time at 1060° C. The heat-treat temperature is dependent on the substrate compatibility, it is to be noted that at higher heat-treat temperature even a short heat-treatment may provide a significant lifetime benefit.

The advantages of the layer system are that it will have a higher stability and better wear retention ability and may not require pre-heat treatment of the components.

According to the present invention the seal coating 2 can be deposited by using an electroplated method. It is noted that the cost of the application of a coating 2 by an electroplated process is with advantage a third of a conventional plasma spray coating. In addition, the process of the invention has a thickness control of ±20 μm of the thickness of the deposited layer, where as conventional plasma spray coating processes have thickness scatters of ±75 μm or even more. Thus, a coating with a layer thickness in a range of 25-400 μm can be applied. Thinner coating increases the mechanical integrity of the sealing system. The used electroplated process has no line of sight limitation and can coat complex contour surfaces i.e. a blade or vane with coating thickness uniformity.

Figure 2:
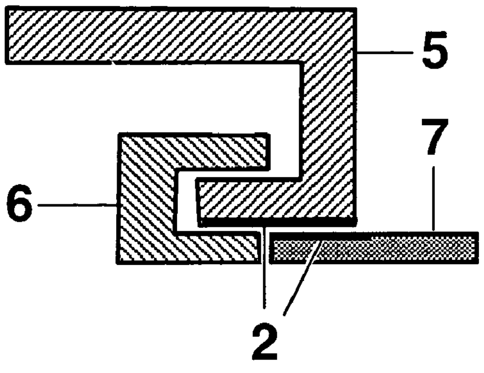

As seen in FIG. 2 this coating 2 can be provided as a seal system between mating surfaces of gas turbine components such as combustion liners 5, whereby a clamp strip 6 and a seal 7 is provided.

While our invention has been described by an example, it is apparent that one skilled in the art could adopt other forms. Accordingly, the scope of our invention is to be limited only by the attached claims.

REFERENCE NUMBERS

1 Article
2 Coating
3 Bottom layer of coating 2
4 Upper layer of coating 2
5 Combustor liner
6 Clamp strip
7 Seal

The invention claimed is:

1. A seal system between two articles wherein at least one article is coated with a wear protective coating, the coating comprises at least a first layer on the surface of the article, the first layer comprising a certain volume fraction of chromium carbides dispersed in a cobalt matrix and at least a second layer of the coating on top of the first layer, the second layer comprising an amount of chromium carbides dispersed in a cobalt matrix which is higher than the amount of chromium carbides in the first layer.

2. The seal system according to claim 1, wherein the coating is provided as a seal between gas turbine components.

3. The seal system according to claim 1, wherein the coating is applied to mating surfaces of two articles or gas turbine components.

4. The seal system according to any of the claim 1, wherein the total thickness of the coating constituting layers is up to 400 μm.

5. The seal system according to any of the claim 1, wherein the thickness of the upper layer s 25 to 75% of the total thickness of the coating.

6. The seal system according to any of the claim 1, wherein the volume fraction of chromium carbide of the upper layer is in the range of 30 to 50%.

7. The seal system according to any of the claim 1, wherein the volume fraction of chromium carbide in the bottom layer is in the range 20 to 30%.

8. The seal system according to any of the claim 1, wherein the seal system is built up of muiltiple layers, each layer has an increasing amount of carbide content, with highest carbide content being in the top layer.

9. The seal system according to claim 4, wherein the total thickness of the coating constituting layers is about 50 to 250 μm.

10. An arrangement comprising:

a first component having a first surface, second component having a second surface; and a coating disposed on at least one of the first and second surface; the coating comprising:

a first layer, the first layer comprising a first amount volume fraction of chromium carbides dispersed in a cobalt matrix, and a second layer, the second layerdisposed over the first layer, the second layer comprising a second volume fraction of chromium carbides dispersed in a cobalt matrix, wherein the first volume fraction of chromium carbides is less than the second volume fraction of chromium carbides.

11. The arrangement of claim 10, wherein the first and second components comprise parts of an engine.

12. The arrangement of claim 11, wherein the engine comprises a gas turbine engine.

13. The arrangement of claim 10, wherein the first and second surfaces are mating surfaces forming a seal therebetween.

14. The arrangement of claim 10, wherein the coating is disposed on both the first and second surfaces.

15. The arrangement of claim 10, wherein the second layer is disposed on the first layer.

16. The arrangement of claim 10, wherein the coating comprises more than two layers, and the outermost layer comprises a certain volume fraction of chromium carbides dispersed in a cobalt matrix, wherein the volume fraction of chromium carbides contained in the outermost layer is greater than the volume fraction of chromium carbides contained in the any of the other layers present in the coating.

17. The arrangement of claim 10, wherein the coating is metallurgically bonded to at least one of the first and second surfaces.

18. The arrangement of claim 10, wherein the first amount is 20-30% by vol., and wherein the second amount is 30-50% by vol.

19. The arrangement of claim 10, wherein the coating has a total thickness of about 15 to 250 μm.

* * * * *